(12) United States Patent
Apanovych et al.

(10) Patent No.: US 11,934,780 B2
(45) Date of Patent: *Mar. 19, 2024

(54) CONTENT SUGGESTION SYSTEM

(71) Applicant: Snap Inc., Santa Monica, CA (US)

(72) Inventors: Mariya Apanovych, Playa Vista, CA (US); William Brendel, Los Angeles, CA (US); Oleksandr Grytsiuk, Marina del Rey, CA (US); Yurii Husiev, Culver City, CA (US); Luis Carlos Dos Santos Marujo, Culver City, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,450

(22) Filed: Sep. 29, 2021

(65) Prior Publication Data

US 2022/0083737 A1 Mar. 17, 2022

Related U.S. Application Data

(63) Continuation of application No. 16/103,626, filed on Aug. 14, 2018, now Pat. No. 11,157,694.

(51) Int. Cl.
*G06F 16/00* (2019.01)
*G06F 16/33* (2019.01)
(Continued)

(52) U.S. Cl.
CPC ........ *G06F 40/274* (2020.01); *G06F 16/3334* (2019.01); *G06F 16/34* (2019.01); *G06F 16/41* (2019.01); *H04L 51/10* (2013.01)

(58) Field of Classification Search
None
See application file for complete search history.

(56) References Cited

U.S. PATENT DOCUMENTS 8,078,669 B2 * 12/2011 Ladd ................. H04N 21/8166
725/111
8,926,425 B2 * 1/2015 Link ................... G07F 17/3255
446/175

(Continued)

FOREIGN PATENT DOCUMENTS

CN 112567360 A 3/2021
KR 20080078431 A 8/2008
(Continued)

OTHER PUBLICATIONS

Interaction and outeraction: instant messaging in action, Nardi et al., (Year: 2000).*
(Continued)

*Primary Examiner* — Jean M Corrielus
(74) *Attorney, Agent, or Firm* — Schwegman Lundberg & Woessner, P.A.

(57) ABSTRACT

Embodiments of the present disclosure relate generally to systems for presenting content suggestions within a messaging interface. A content suggestion system performs operations that include: receiving inputs that include a text string into a messaging interface; parsing a keyword from the text string of the input in response to receiving the inputs; retrieving message content that includes at least a media item based on the keyword; and presenting a chat suggestion that includes the message content within the messaging interface, according to certain example embodiments.

17 Claims, 14 Drawing Sheets

(51) Int. Cl.
*G06F 16/34* (2019.01)
*G06F 16/41* (2019.01)
*G06F 40/274* (2020.01)
*H04L 51/10* (2022.01)

(56) References Cited

U.S. PATENT DOCUMENTS

| | | | |
|---|---|---|---|
| 9,043,397 B1 | 5/2015 | Ravichandran et al. | |
| 9,060,100 B2* | 6/2015 | Boortz | H04N 21/262 |
| 9,215,506 B2* | 12/2015 | Poniatowski | G06F 40/274 |
| 9,306,878 B2* | 4/2016 | Patil | G06N 20/00 |
| 9,323,810 B2 | 4/2016 | Wang et al. | |
| 9,582,485 B2* | 2/2017 | Greenberg | G06F 3/0484 |
| 9,930,167 B2 | 3/2018 | Bruno | |
| 10,015,418 B2 | 7/2018 | Nam et al. | |
| 10,412,030 B2 | 9/2019 | Mcgregor, Jr. et al. | |
| 10,693,819 B1 | 6/2020 | Boyd et al. | |
| 10,862,835 B2 | 12/2020 | Al Majid et al. | |
| 2002/0137507 A1* | 9/2002 | Winkler | H04W 88/184 |
| | | | 455/445 |
| 2008/0114848 A1* | 5/2008 | Lira | H04L 51/04 |
| | | | 709/206 |
| 2008/0134053 A1* | 6/2008 | Fischer | G06F 16/9535 |
| | | | 715/747 |
| 2009/0094511 A1* | 4/2009 | Szeto | G06F 3/0482 |
| | | | 715/234 |
| 2009/0113315 A1* | 4/2009 | Fisher | H04L 12/1827 |
| | | | 715/758 |
| 2012/0072856 A1 | 3/2012 | Park et al. | |
| 2013/0024891 A1 | 1/2013 | Elend et al. | |
| 2013/0046791 A1* | 2/2013 | Markman | G06F 16/367 |
| | | | 707/794 |
| 2013/0047099 A1* | 2/2013 | Markman | G06F 40/253 |
| | | | 715/758 |
| 2013/0212190 A1* | 8/2013 | Patil | G06N 5/04 |
| | | | 709/206 |
| 2014/0075313 A1* | 3/2014 | Bachman | G06Q 30/0643 |
| | | | 715/716 |
| 2014/0146063 A1* | 5/2014 | Abdo | G06F 9/452 |
| | | | 345/530 |
| 2015/0127748 A1* | 5/2015 | Buryak | H04L 51/52 |
| | | | 709/206 |
| 2016/0006056 A1 | 1/2016 | Jeon | |
| 2016/0048901 A1 | 2/2016 | Bax et al. | |
| 2016/0050166 A1 | 2/2016 | Smith | |
| 2016/0127763 A1* | 5/2016 | Patel | H04N 21/4532 |
| | | | 348/564 |
| 2016/0179844 A1 | 6/2016 | Shen et al. | |
| 2016/0380953 A1 | 12/2016 | Mashtakov | |
| 2017/0235838 A1 | 8/2017 | Shaw et al. | |
| 2017/0344224 A1 | 11/2017 | Kay et al. | |
| 2018/0083898 A1* | 3/2018 | Pham | H04L 51/046 |
| 2018/0083901 A1 | 3/2018 | Mcgregor, Jr. et al. | |
| 2018/0198743 A1* | 7/2018 | Blackstock | H04L 51/063 |
| 2018/0241704 A1 | 8/2018 | Al Majid et al. | |
| 2018/0295081 A1 | 10/2018 | Mcgregor, Jr. et al. | |
| 2018/0359199 A1 | 12/2018 | Nguyen et al. | |
| 2018/0367484 A1 | 12/2018 | Rodriguez et al. | |
| 2019/0319899 A1 | 10/2019 | Dos Santos Marujo et al. | |
| 2019/0319904 A1 | 10/2019 | Al Majid et al. | |
| 2020/0057804 A1 | 2/2020 | Apanovych et al. | |
| 2021/0377200 A1* | 12/2021 | Heikkinen | H04L 51/10 |

FOREIGN PATENT DOCUMENTS

| | | |
|---|---|---|
| KR | 101791979 B1 | 11/2017 |
| KR | 20180006951 A | 1/2018 |
| KR | 20180080986 A | 7/2018 |
| WO | WO-2020037059 A1 | 2/2020 |

OTHER PUBLICATIONS

Let's Shop Online Together: An Empirical Investigation of Collaborative Online Shopping Support, Zhu et al., (Year: 2009).*

Common ground (Year: 2002).*

Interaction and Outeraction Instant Messaging in Action, Nardi et al., (Year: 2020).*

Common Ground, Robert Stalnaker (Year: 2002).*

"U.S. Appl. No. 16/103,626, Final Office Action dated Feb. 3, 2021", 19 pgs.

"U.S. Appl. No. 16/103,626, Final Office Action dated Aug. 31, 2020", 11 pgs.

"U.S. Appl. No. 16/103,626, Non Final Office Action dated Mar. 17, 2021", 12 pgs.

"U.S. Appl. No. 16/103,626, Non Final Office Action dated May 29, 2020", 11 pgs.

"U.S. Appl. No. 16/103,626, Non Final Office Action dated Nov. 12, 2020", 12 pgs.

"U.S. Appl. No. 16/103,626, Notice of Allowance dated Jun. 24, 2021", 17 pgs.

"U.S. Appl. No. 16/103,626, Response filed Feb. 24, 2021 to Final Office Action dated Feb. 3, 2021", 14 pgs.

"U.S. Appl. No. 16/103,626, Response filed Apr. 20, 2021 to Non Final Office Action dated Mar. 17, 2021", 10 pgs.

"U.S. Appl. No. 16/103,626, Response filed Jun. 12, 2020 to Non Final Office Action dated May 29, 2020", 9 pgs.

"U.S. Appl. No. 16/103,626, Response filed Sep. 16, 2020 to Final Office Action dated Aug. 31, 2020", 10 pgs.

"U.S. Appl. No. 16/103,626, Response filed Dec. 2, 2020 to Non Final Office Action dated Nov. 12, 2020", 11 pgs.

"International Application Serial No. PCT/US2019/046529, International Preliminary Report on Patentability dated Feb. 25, 2021", 8 pgs.

"International Application Serial No. PCT/US2019/046529, International Search Report dated Dec. 4, 2019", 3 pgs.

"International Application Serial No. PCT/US2019/046529, Written Opinion dated Dec. 4, 2019", 6 pgs.

"Korean Application Serial No. 10-2021-7007244, Notice of Preliminary Reasons for Refusal dated Nov. 21, 2022", w/ English Translation, 16 pgs.

"Korean Application Serial No. 10-2021-7007244, Notice of Preliminary Rejection dated May 6, 2023", w/ English Translation, 13 pgs.

"Korean Application Serial No. 10-2021-7007244, Response filed Jan. 25, 2023 to Notice of Preliminary Reasons for Refusal dated Nov. 21, 2022", w/ English Claims, 24 pgs.

* cited by examiner

500

```
CAUSING DISPLAY OF A PRESENTATION OF THE TEXT STRING WITHIN THE
MESSAGING INTERFACE IN RESPONSE TO THE RECEIVING THE MESSAGE
CONTENT, THE PRESENTATION OF THE TEXT STRING INCLUDING THE
KEYWORD
502
```

```
EMPHASIZING THE KEYWORD WITHIN THE PRESENTATION OF THE TEXT
STRING IN RESPONSE TO THE IDENTIFYING THE KEYWORD
504
```

```
┌─────────────────────────────────────────────────────────────────┐
│  ACCESSING A MEDIA REPOSITORY IN RESPONSE TO THE IDENTIFYING    │
│            THE KEYWORD BASED ON THE TEXT STRING                 │
│                              702                                │
└─────────────────────────────────────────────────────────────────┘
                                │
                                ▼
┌─────────────────────────────────────────────────────────────────┐
│  IDENTIFYING THE MEDIA ITEM WITHIN THE MEDIA REPOSITORY BASED ON│
│                          THE KEYWORD                            │
│                              704                                │
└─────────────────────────────────────────────────────────────────┘
```

*FIG. 7*

CONTENT SUGGESTION SYSTEM

CLAIM OF PRIORITY

This application is a continuation of U.S. patent application Ser. No. 16/103,626, filed Aug. 14, 2018, which is incorporated herein by reference in its entirety.

TECHNICAL FIELD

Embodiments of the present disclosure relate generally to messaging services, and more particularly, to systems for presenting content suggestions within a messaging interface.

BACKGROUND

Users increasingly rely on messaging applications instead of traditional phone calls for the purposes of communication with other users. Messaging applications are advantageous in that they provide enhanced interfaces through which users may communicate using various forms of media content such as pictures, videos, and audio files.

While these messaging applications are advantageous over traditional communication methods for many reasons, the increased functionality may often lead to difficulties in identifying and selecting appropriate media content to share in a conversation. As a result, users may disrupt an organic and natural flow of a conversation due to a need for excessive time in identifying relevant media content to share. A system to provide messaging suggestions would therefore be an improvement over existing systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart illustrating a method for presenting a content suggestion in a messaging interface, according to certain example embodiments.

FIG. 7 is a flowchart illustrating a method for presenting a content suggestion in a messaging interface, according to certain example embodiments.

DETAILED DESCRIPTION

Figure 1:
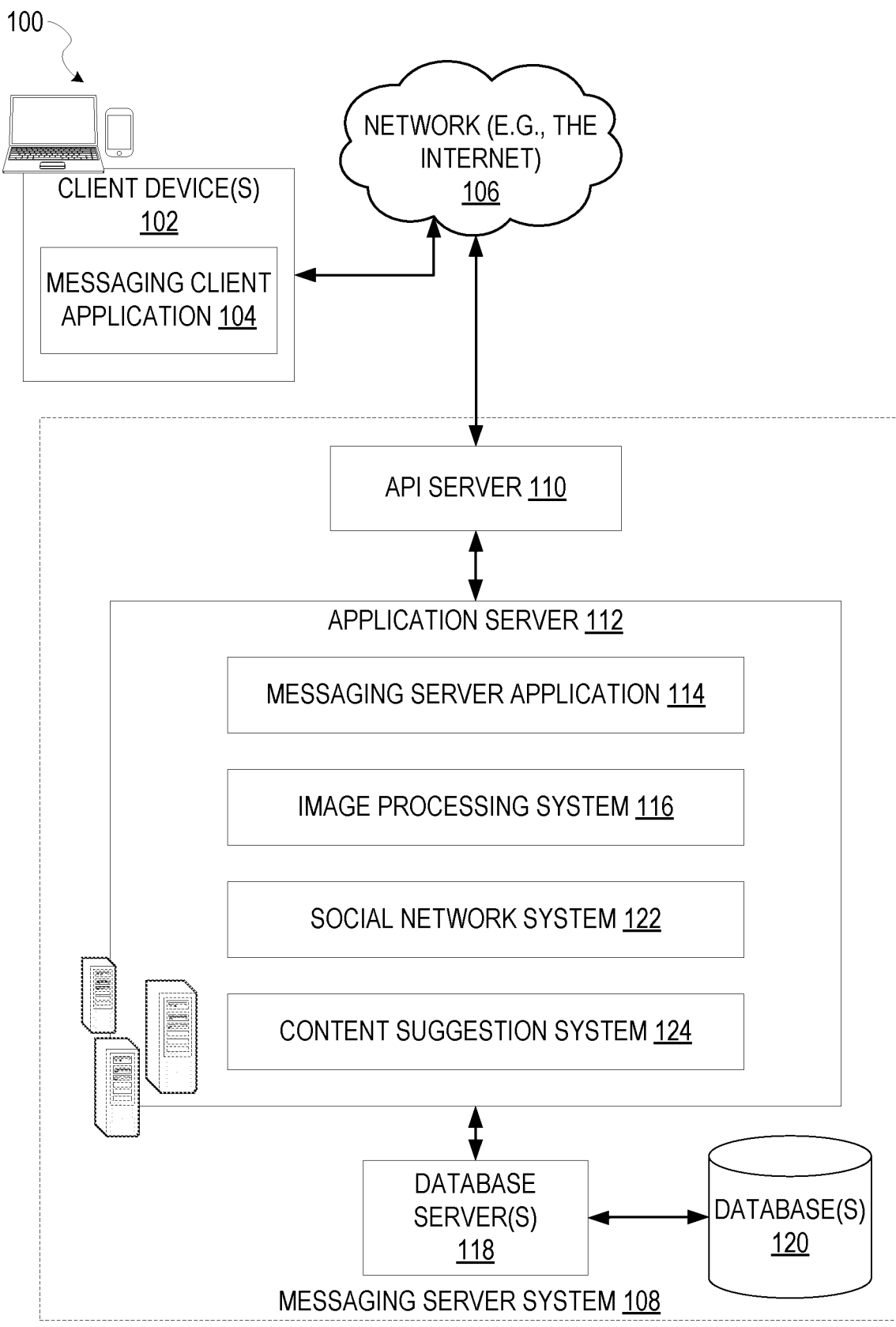
FIG. 1 is a block diagram showing an example messaging system for exchanging data (e.g., messages and associated content) over a network in accordance with some embodiments, wherein the messaging system includes a content suggestion system.

Messaging applications provide enhanced interfaces to enable users to communicate with one another by sharing text as well as various forms of media content. While useful, it is often difficult and time consuming to search for and identify relevant media content, due to the increasing amounts of media content available. As a result, the natural flow of a conversation may be disrupted.

Embodiments of the present disclosure relate generally to systems for presenting content suggestions within a messaging interface. A content suggestion system performs operations that include: receiving inputs that include message content that comprises a text string into a messaging interface; identifying a keyword based on the text string of the message content in response to receiving the message content; retrieving one or more media items based on the keyword; and presenting a chat suggestion that includes a presentation of at least the media item within the messaging interface, according to certain example embodiments.

In some embodiments, the content suggestion system generates and displays a messaging interface to facilitate communication between users. The messaging interface includes a display of message content, as well as a display of a message input field where a user may provide message content as an input into the messaging interface. For example, the user may provide the message content as an input into the message input field, wherein the input comprises a text string, one or more graphical icons (e.g., emoji), or a combination of text and graphical icons.

Responsive to receiving the input into the message input field, and in real-time, the content suggestion system displays the message content of the input within the messaging interface, and parses the message content to identify one or more keywords. Keywords may include words or phrases, as well as various index terms that comprise numbers as well as graphical icons and letters. For example, a keyword may include an emoji smiley face, a heart icon, a string of numbers (e.g., 143), as well as a string of text (e.g., "I love you").

In some embodiments, the keywords identified by the content suggestion system may be emphasized within the interface in real-time. For example, in response to receiving the input into the message input field, the content suggestion system causes display of a presentation of the text string received through the input within the messaging interface. The presentation of the text string may simply comprise a display of the text string using a standard color or font that may be defined by a user profile, or by an administrator of the messaging application. In response to identifying the keyword based on the text string, in some embodiments the content suggestion system emphasizes the keyword within the presentation of the text string by displaying the keyword in a color or font different than the standard color or font, or in some embodiments by animating the keyword to indicate movement.

In response to identifying the one or more keywords within the message content of the input, the content suggestion system accesses a media index within a media content repository to identify and retrieve relevant media content. The content suggestion system may query the media index to identify one or more media items based on the keyword of the message content.

In some example embodiments, the media content repository comprises a media index that comprises a collection of various forms of media items, that include but are not limited to: images, Graphics Interchange Format images (GIFs), videos, augmented reality filters (e.g., face filters, lenses, content filters), and audio data. The media items may each be tagged with one or more index terms within the media index, such that reference to the index terms may identify a memory location of a corresponding media item, or media item category. In further embodiments, the media items may be organized in collections that are tagged with index terms. For example, a collection of media items may be tagged with the index term "love."

The content suggestion system presents a chat suggestion to the user within the messaging interface based on the one or more media items identified based on the keyword. The chat suggestion may be presented as a graphical icon within the messaging interface proximate to the message input field. For example, in response to identifying and retrieving media items based on the keyword, the content suggestion system may generate and cause display of the chat suggestion within the messaging interface.

In some embodiments, the content suggestion system may curate and present a collection of media items as chat suggestions. Each media item among the collection of media items may be identified from the media content repository based on the keyword. For example, the collection of media items may be displayed to the user within the messaging interface within a suggestion carousel, wherein a user may scroll through the collection of media items.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a content suggestion system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
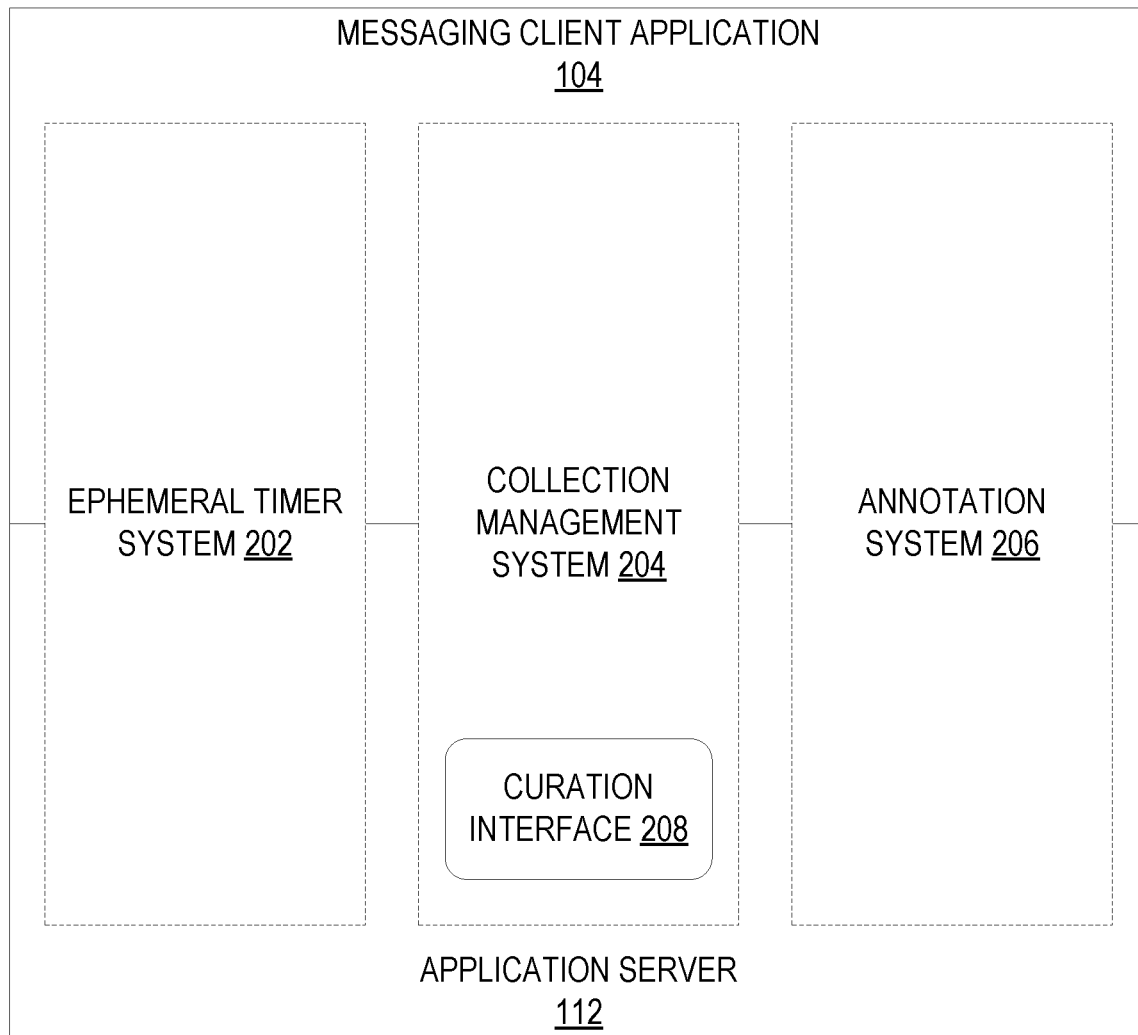
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages), Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models and image filters. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
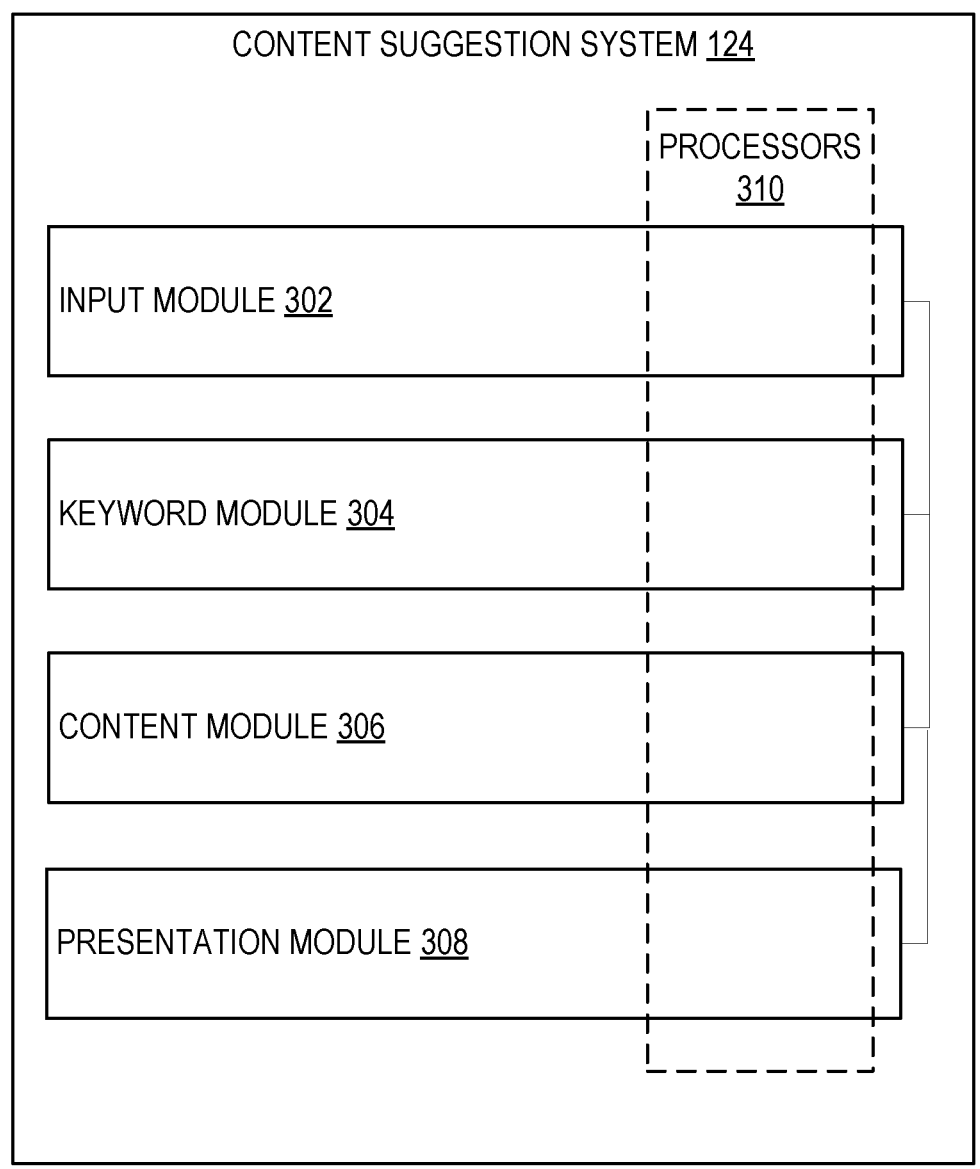
FIG. 3 is a block diagram illustrating various modules of a content suggestion system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the content suggestion system 124 that configure the content suggestion system 124 to identify and present content suggestions based on inputs received through a messaging interface, according to some example embodiments. The content suggestion system 124 is shown as including an input module 302, a keyword module 304, a content module 306, and a presentation module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the content suggestion system 124 may physically include an arrangement of one or more of the processors 308 (e.g., a subset of or among the one or more processors of the machine) configured to perform the operations described herein for that module. As another example, any module of the content suggestion system 124 may include software, hardware, or both, that configure an arrangement of one or more processors 310 (e.g., among the one or more processors of the machine) to perform the operations described herein for that module. Accordingly, different modules of the content suggestion system 124 may include and configure different arrangements of such processors 310 or a single arrangement of such processors 310 at different points in time. Moreover, any two or more modules of the content suggestion system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
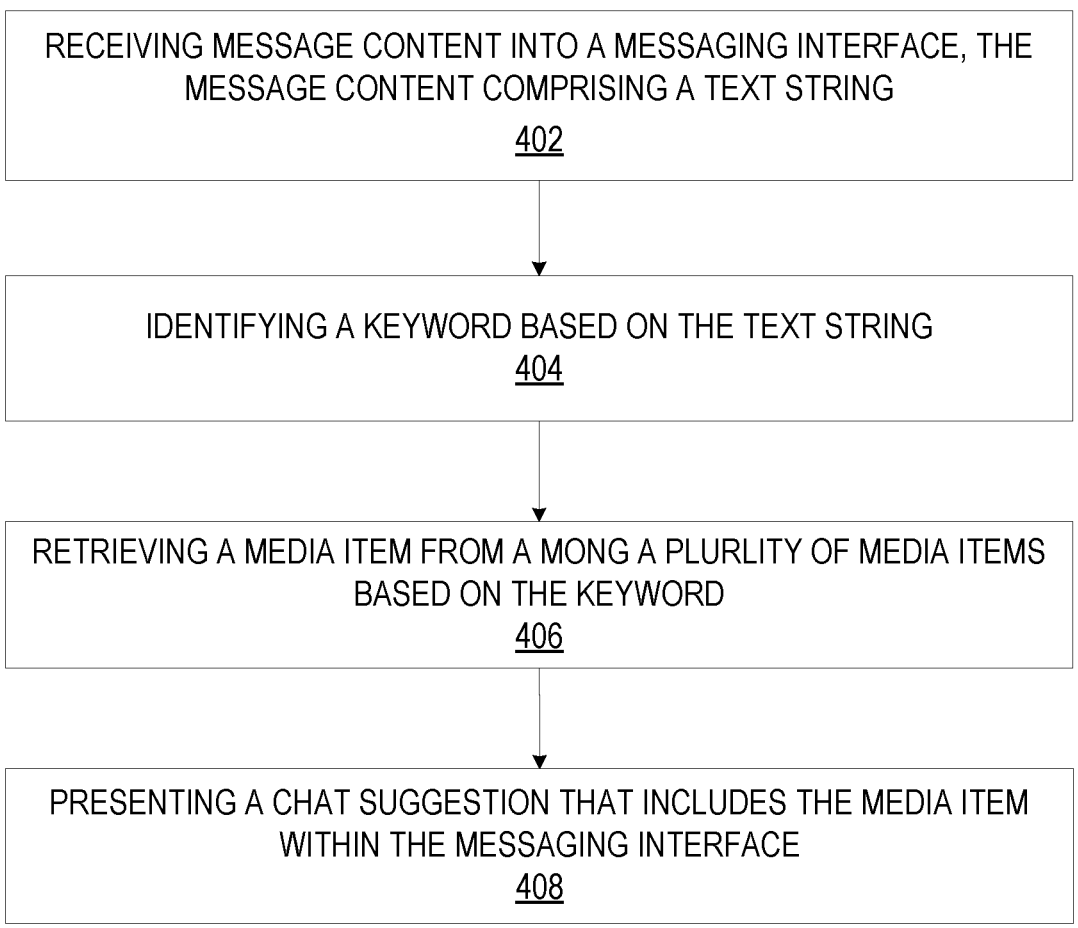
FIG. 4 is a flowchart illustrating a method for presenting a content suggestion in a messaging interface, according to certain example embodiments.

FIG. 4 is a flowchart illustrating a method 400 for presenting a content suggestion in a messaging interface, according to certain example embodiments. Operations of the method 400 may be performed by the modules described above with respect to FIG. 3. As shown in FIG. 4, the method 400 includes one or more operations 402, 404, 406, and 408.

At operation 402, the input module 302 receives an input into a messaging interface presented at a client device (e.g., the client device 102). The input may for example include message content that comprises a text string, as well as graphical icons such as emoji, numbers, and punctuation characters.

At operation 404, the keyword module 304 identifies a keyword based on the text string of the message content. For example, the keyword module 304 may parse the message content to identify one or more keywords in response to receiving the input into the messaging interface. The keywords may comprise text strings as well as other index terms based on combinations of letters, numbers, emoji, or punctuation characters.

At operation 406, the content module 306 identifies and retrieves a media item based on the keyword. The media items may for example include audio data, video data, images, as well as interactive media content such as augmented reality lenses and filters. For example, the content module 306 may access a media repository (e.g., the database 120) in response to the keyword module 304 identifies one or more keywords within the message content. The media repository may comprises a collection of media items tagged with index terms, such that reference to the index terms may identify a memory location of a media item. The content module 306 accesses the media repository and retrieves one or more media items based on the keyword.

At operation 408, the presentation module 308 generates and causes display of a chat suggestion within the messaging interface, wherein the chat suggestion includes a media item from among the one or more media items retrieved from the media repository. In some embodiments, the chat suggestion may comprise presentation of a graphical icon, wherein the graphical icon is based on the media item. In further embodiments, the chat suggestion may be presented as a curated selection of a collection of media items, wherein each media item among the collection of media items is retrieved based on the keyword. A sort order of the collection may be based on a ranking of the media items, wherein the ranking may be based on overall usage metrics (e.g., popularity), or based on relevance to the keyword (e.g., based on index term similarity).

FIG. 5 is a flowchart illustrating a method 500 for presenting a content suggestion in a messaging interface, according to certain example embodiments. Operations of the method 500 may be performed by the modules described above with respect to FIG. 3. As shown in FIG. 5, the method 500 includes one or more operations 502 and 504.

At operation 502, in response to receiving the input into the messaging interface as discussed in operation 402 of the method 400, the presentation module 308 causes display of a presentation of the text string from the message content at a position within the messaging interface. The presentation of the message content may for example comprise a display of a text string in a predefined font, color, size, or display format.

At operation 504, in response to the keyword module 304 identifying the keyword based on the text string, as in operation 404 of the method 400, the presentation module 308 emphasizes a display of the keyword within the presentation of the text string. For example, the presentation module 308 may display the keyword among the presentation of the text string in an emphasized font, color, or display format.

Figure 6:
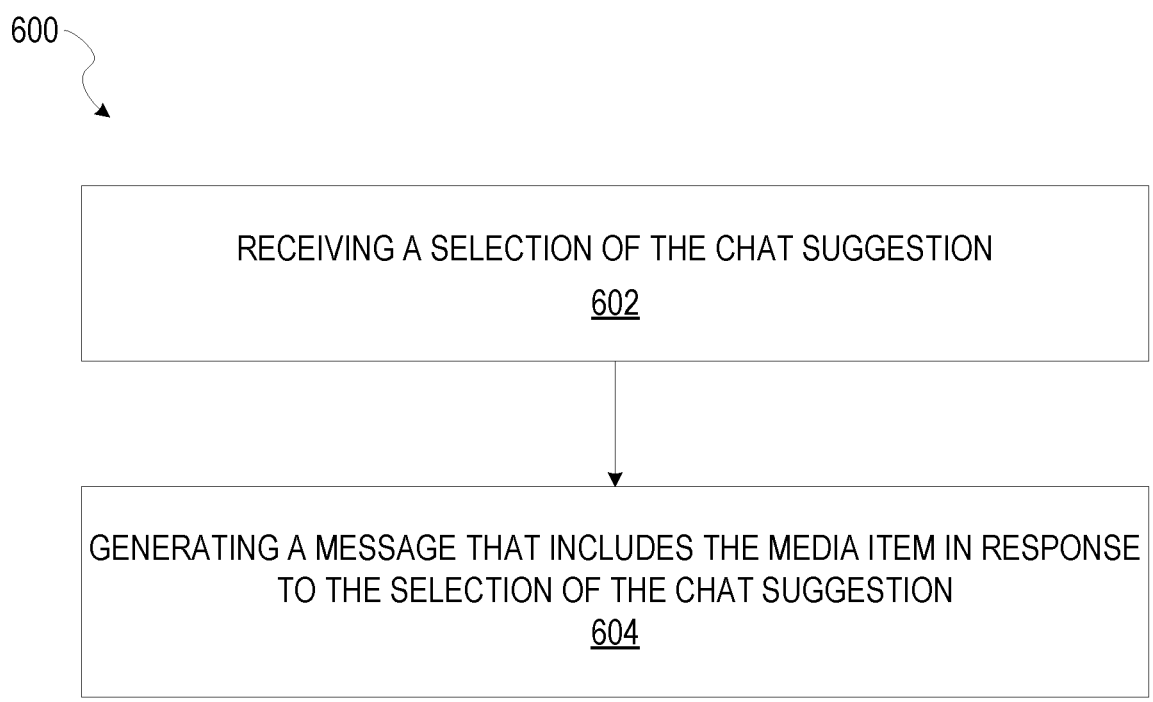
FIG. 6 is a flowchart illustrating a method for generating a message based on a content suggestion, according to certain example embodiments.

FIG. 6 is a flowchart illustrating a method 600 for generating a message based on a content suggestion, according to certain example embodiments. Operations of the method 600 may be performed by the modules described above with respect to FIG. 3. As shown in FIG. 6, the method 600 includes one or more operations 602 and 604.

At operation 602, the input module 302 receives an input through the messaging interface, wherein the input comprises a selection of a content suggestion (i.e., a media item) presented to the user. For example, a user of the client device 102 may be presented with a content suggestion, as in operation 408 of the method 400. Upon reviewing the content suggestion, in order to select the content suggestion, the user may provide an input through the messaging interface that includes a selection of the media item represented by the content suggestion.

At operation 604, in response to receiving the selection of the content suggestion, the presentation module 308 generates a message based on at least the message content received from the user of the client device in operation 402 of the method 400, and the content suggestion selected by the user. The presentation module 308 generates and causes display of a presentation of the message within the messaging interface.

FIG. 7 is a flowchart illustrating a method 700 presenting a content suggestion in a messaging interface, according to certain example embodiments. Operations of the method 700 may be performed by the modules described above with respect to FIG. 3. As shown in FIG. 7, the method 700 includes one or more operations 702 and 704.

At operation 702, in response to the keyword module 304 parsing the message content received from the user as in operation 404 of the method 400, the content module 306 accesses a media repository (e.g., the database 120), wherein the media repository comprises a collection of media items, wherein each media item is indexed and tagged with one or more index terms. For example, the media may be organized in the media repository into one or more collections of media items, wherein each collection is itself tagged with one or more index terms.

At operation 704, the content module 306 identifies media items to be presented to the user as message content. The content module 306 accesses the media repository and identifies media content based on the keyword (e.g., the index terms).

Figure 8:
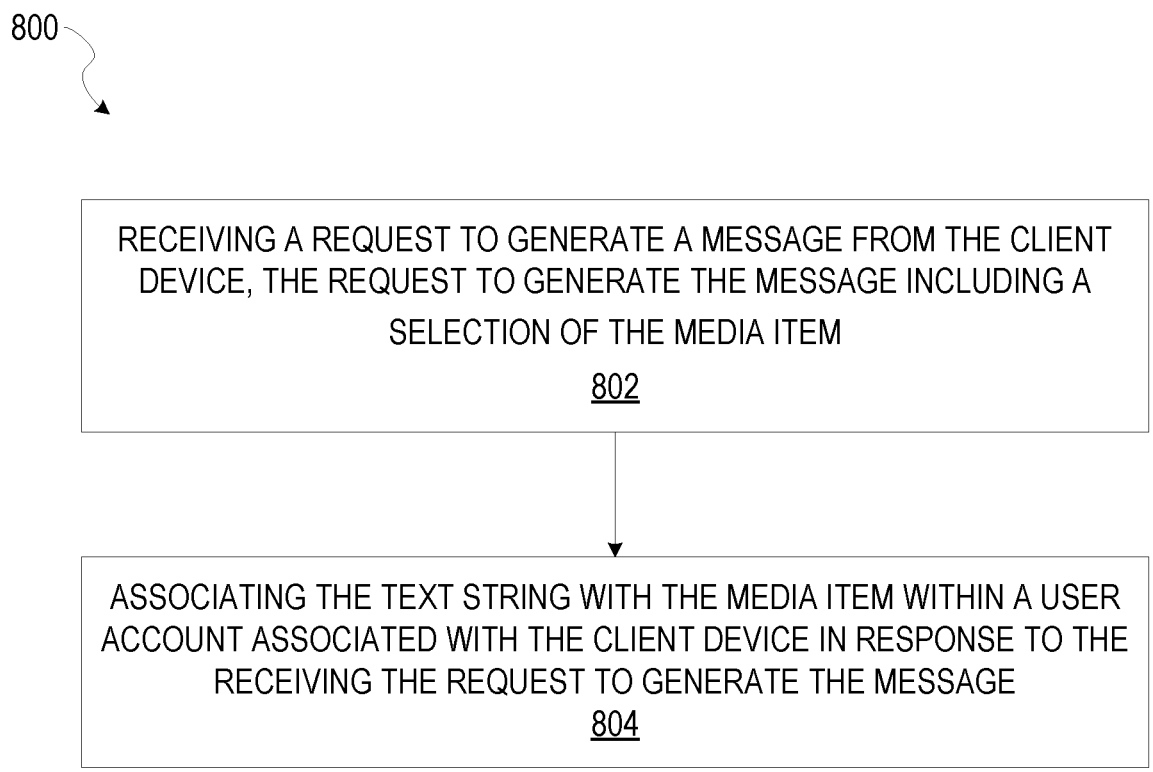
FIG. 8 is a flowchart illustrating a method for associating an index term with a media item at a media repository, according to certain example embodiments.

FIG. 8 is a flowchart illustrating a method 800 for generating a media index, according to certain example embodiments. Operations of the method 800 may be performed by the modules described above with respect to FIG. 3. As shown in FIG. 8, the method 800 includes one or more operations 802 and 804.

The media index comprises associations between media items with various index terms that include keywords. The media index may be hosted within a media repository, such as the database 120, as well as at a memory location of a client device 102. Reference to an index term within the media index therefore identifies a memory location of one or more media items, which may be organized in collections. For example, the index term that comprises the text string "LOVE" may reference a memory location that comprises a plurality of media items which have been tagged with the index term.

At operation 802, the input module 302 receives a request to generate a message from the client device 102. In some embodiments, the request to generate the message may occur before the method 400. The request to generate the message may for example include the message content that includes a text string or other index term, and a selection of a chat suggestion that includes the media item.

At operation 804, in response to the request to generate the message that includes the message content and the selection of the chat suggestion, the keyword module 304 generates a media index that includes a linking of the index term from the message content with the media item, such that reference to the index term identifies a memory location of the media item. In some embodiments, the media index may correspond with a user profile associated with the client device 102, such that the media index is "personalized" to a user of the client device 102. In further embodiments, the media index may be located within the database 120, and may be updated and maintained based on requests to generate messages from a plurality of devices that include the client device 102.

Figure 9:
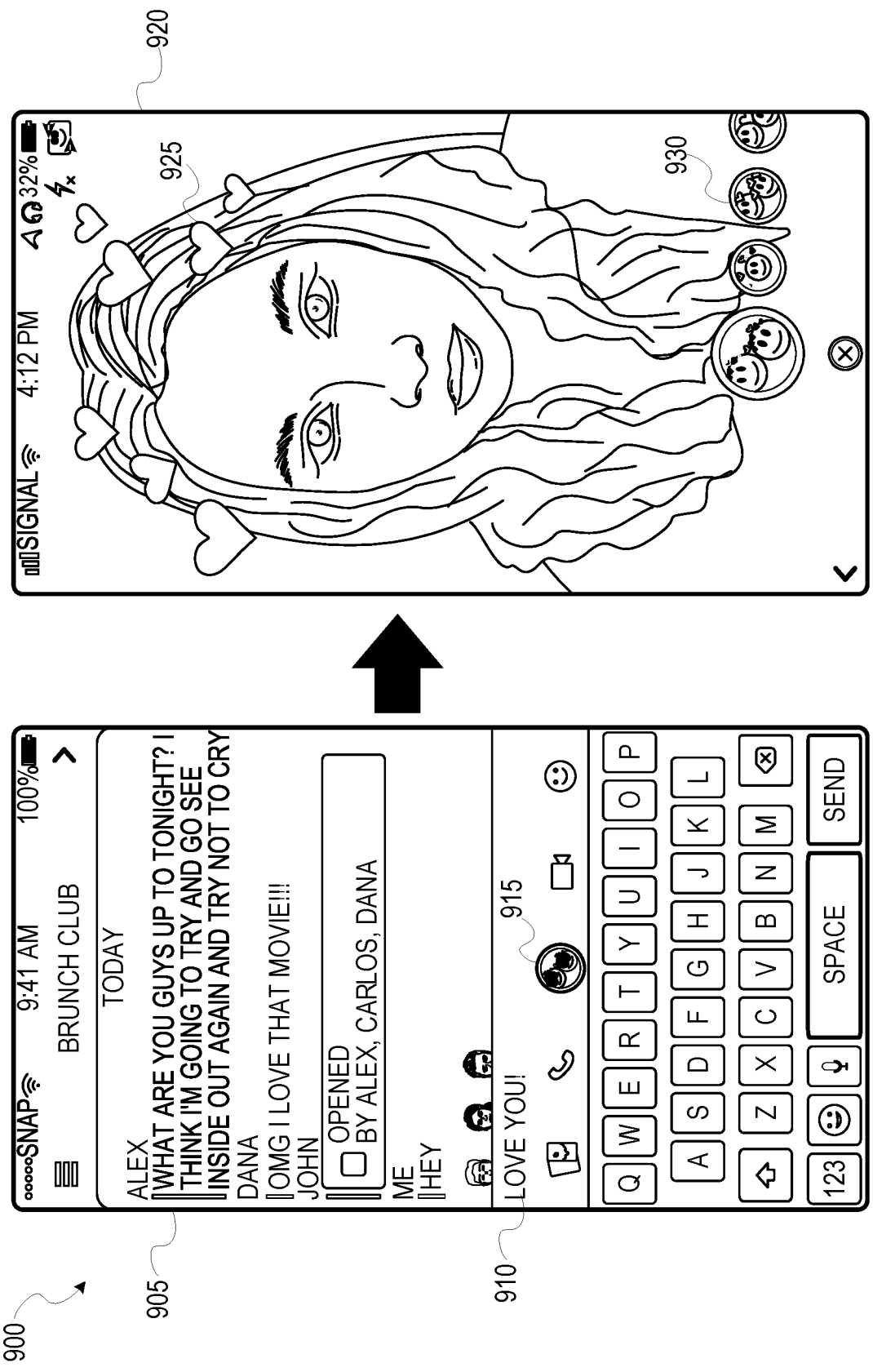
FIG. 9 is an interface diagram depicting a messaging interface, according to certain example embodiments.

FIG. 9 is an interface diagram 900 depicting a messaging interface 905, according to certain example embodiments. As seen in FIG. 9, the messaging interface 905 comprises a presentation of a set of messages received from one or more users, message content 910 into the messaging interface 905, the message content 910 comprising a text string, and a chat suggestion 915, generated based on the message content 910. The messaging interface 905 may be presented at a client device 102.

As discussed in the method 400 of FIG. 4, a user may provide the message content 910 into the messaging interface 905. In response to receiving the message content 910, the various modules of the content suggestion system 240 parses the message content 910 to identify one or more keywords, and identify one or more media items to present to the user within the messaging interface 905 as the chat suggestion 915.

As seen in FIG. 9, the chat suggestion 915 in this example embodiment comprises a display of a graphical icon, wherein the particular shape and/or appearance of the graphical icon is based on the message content retrieved based on the keyword parsed from the message content 910.

In some embodiments, a user may generate a message, such as the message 920, based on the message content 910 and a selection of the chat suggestion 915. For example, the chat suggestion 915 may be presented within an icon that comprises a representation of the media item 925, wherein the media item 925 includes an augmented reality filter element that corresponds to a keyword parsed from the message content 910.

In further embodiments, the content suggestion system 240 may generate and display a collection 930, wherein the collection 930 comprises a presentation of a set of media items that correspond with the keyword parsed from the message content 910. For example, as discussed in operation 408 of the method 400, a chat suggestion may comprise a curated collection of media items, such as the collection 930. A user may scroll through the collection 930 to identify and select one or more media items, such as the media item 925, from among the collection 930.

Figure 10:
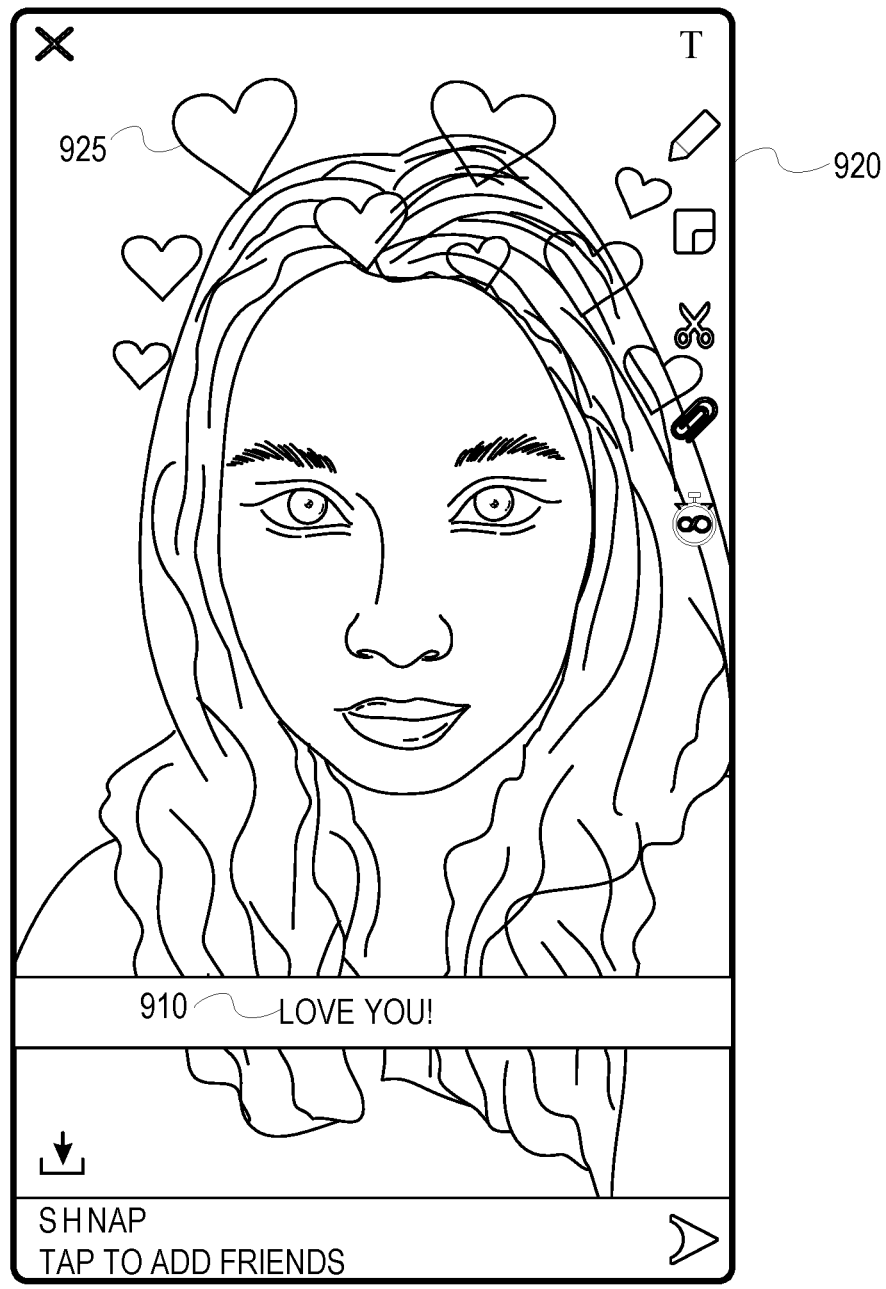
FIG. 10 is an interface diagram depicting a message generated using a messaging interface, according to certain example embodiments.

FIG. 10 is an interface diagram 1000 depicting a message 920 generated using the messaging interface 905, according to certain example embodiments. As seen in FIG. 10, the message 920 comprises a presentation of the message content 910 (i.e., a text string), and the media item 925 from the chat suggestion 915. As seen in the interface diagram 1000, the media item 925 may include an augmented reality filter element.

Figure 11:
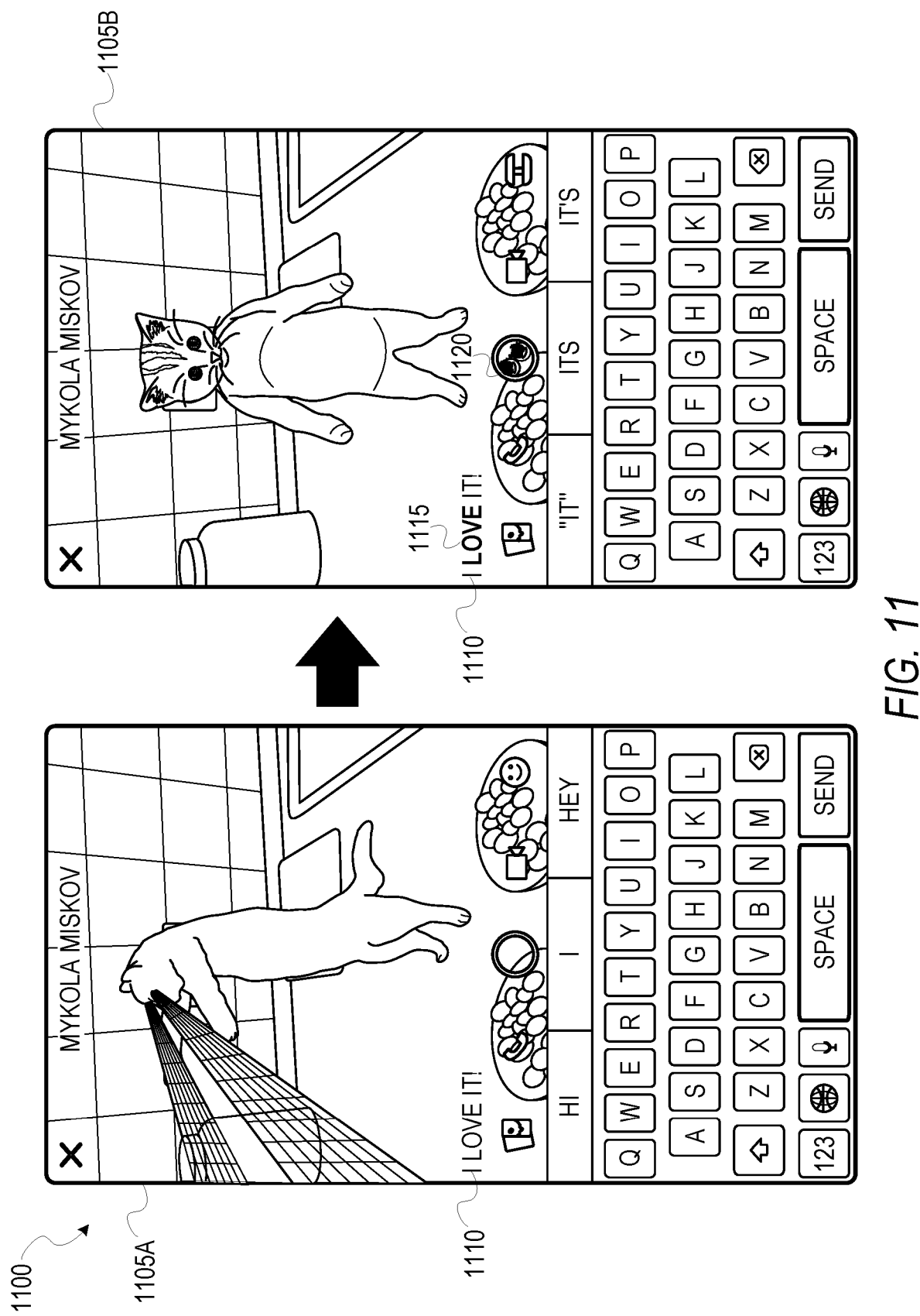
FIG. 11 is an interface diagram depicting a messaging interface, according to certain example embodiments.

FIG. 11 is an interface diagram 1100 depicting a messaging interface 1105, according to certain example embodiments. As seen in FIG. 11, the messaging interface 1105 comprises a presentation of message content 1110, and a chat suggestion 1120, generated based on the message content 1110. The messaging interface 1105 may be presented at a client device 102.

As discussed in the method 500 of FIG. 5, the keyword 1115 within the input 1110 may be emphasized in response to the content suggestion module 240 parsing the message content 1110 to identify the keyword 1115.

Figure 12:
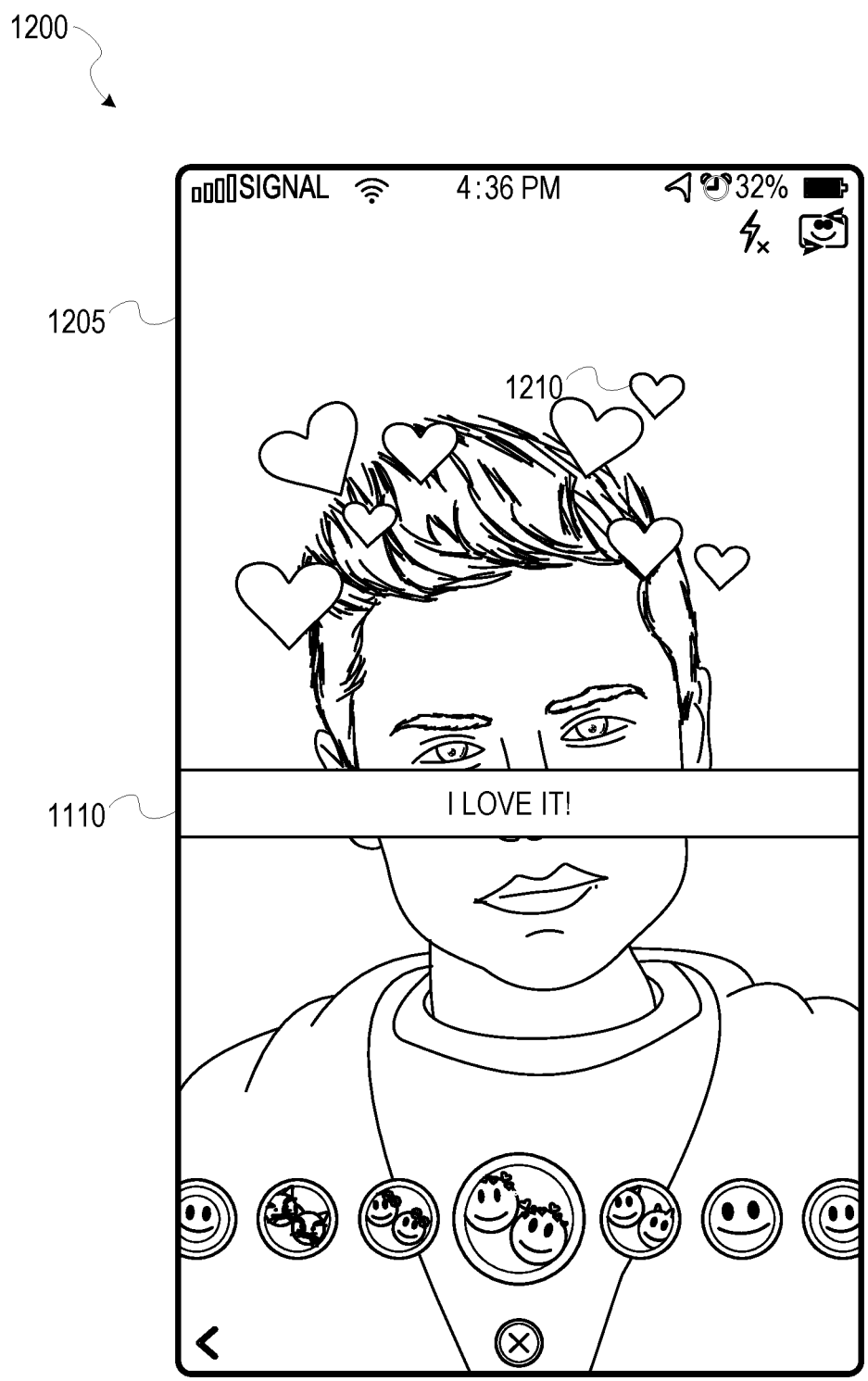
FIG. 12 is an interface diagram depicting a message generated using a messaging interface, according to certain example embodiments.

FIG. 12 is an interface diagram 1200 depicting a message 1205 generated using the messaging interface 1105, according to certain example embodiments. As seen in FIG. 12, the message 1205 comprises a presentation of the message content 1110, and a media item 1210 from the chat suggestion 1120.

Software Architecture

Figure 13:
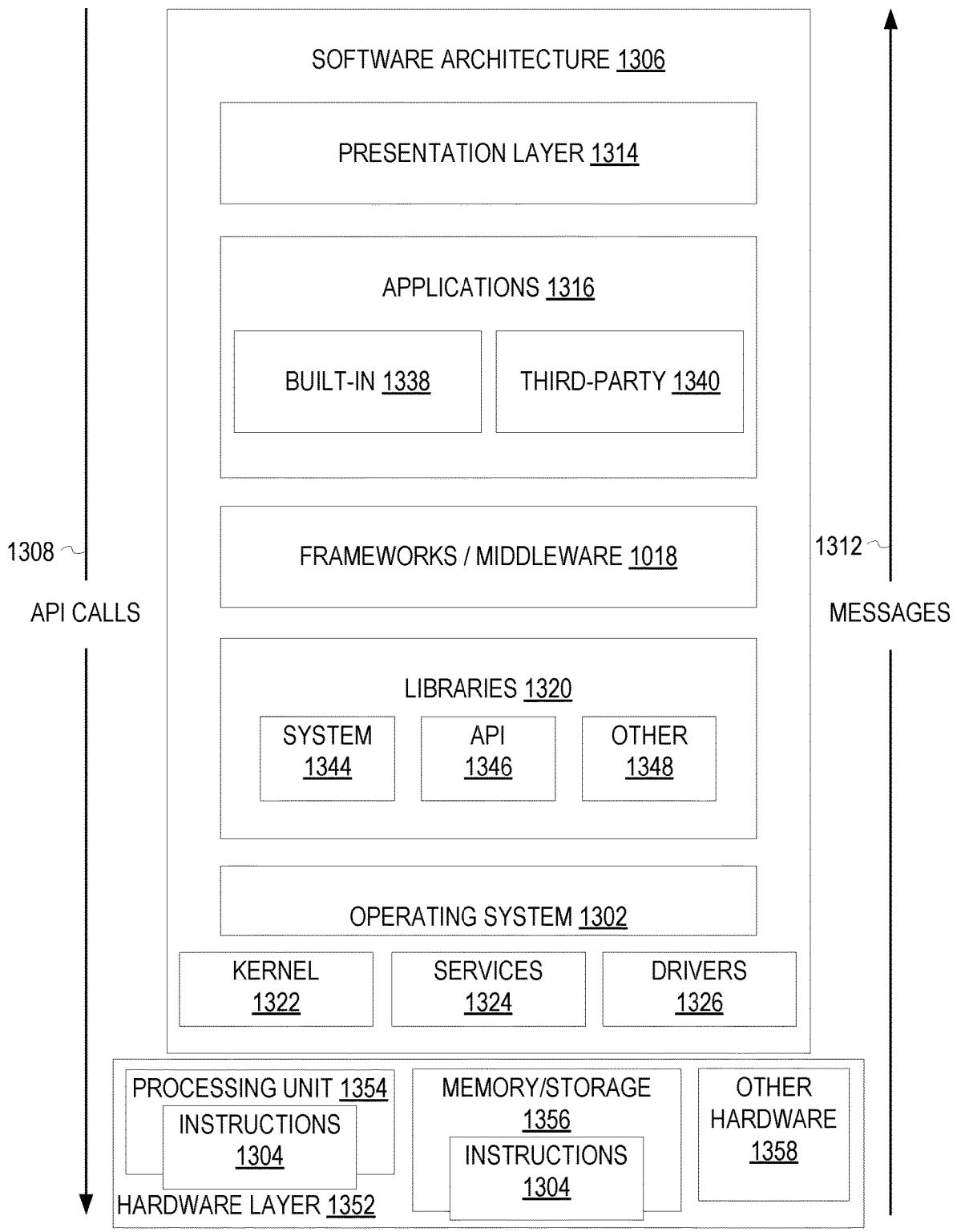
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as the machine 1400 of FIG. 14 that includes, among other things, processors 1404, memory 1414, and I/O components 1418. A representative hardware layer 1352 is illustrated and can represent, for example, the machine 1300 of FIG. 13. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) APT calls 1308 through the software stack and receive a response as in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like, In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
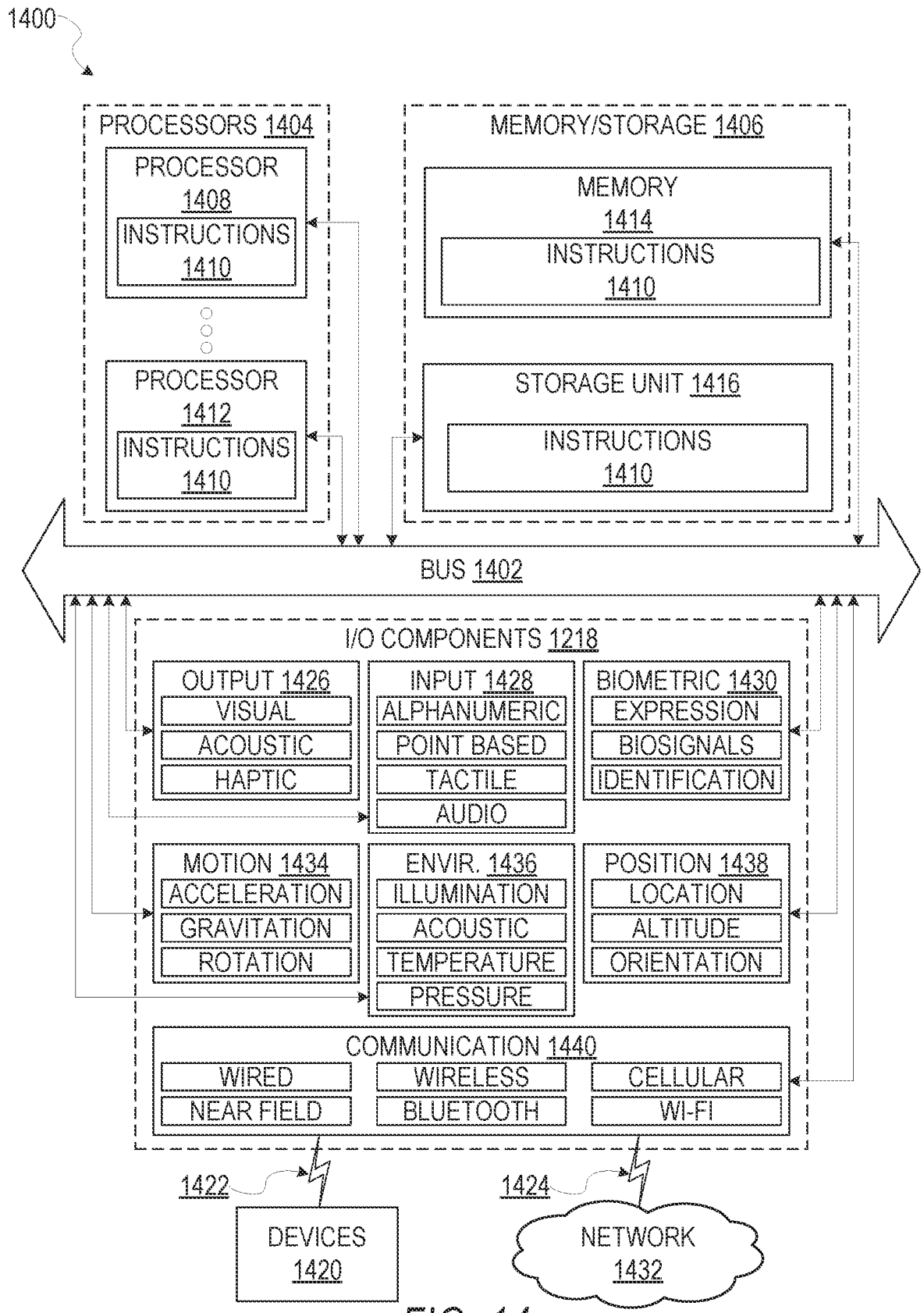
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory storage 1406, and components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the 110 components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

Glossary

"CARRIER SIGNAL " in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (FISPA), Worldwide Interoperability for Microwave Access (WiMAX), Long Term Evolution (LTE) standard, others defined by various standard setting organizations, other long range protocols, or other data transfer technology.

"EMPHEMERAL MFSSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   receiving an input into a messaging interface presented at a client device, the input comprising a text string;
   accessing a media repository that comprises a collection of media items tagged with index terms;
   curating a collection of message content that comprises one or more media items from among the collection of media items within the media repository based on the text string and the index terms, the one or more media items comprising graphical content;
   determining a sort order of the one or more media items from among the collection of message content based on a ranking of the media items, wherein the ranking is based on relevance to the text string received via the messaging interface; and
   presenting a display of the one or more media items within a suggestion carousel displayed at a position within the messaging interface of the client device based on the sort order, the suggestion carousel configured to receive a user input to scroll through the one or more media items within the suggestion carousel.

2. The method of claim 1, wherein the method further comprises:
   receiving a selection of a media item from among the one or more media items presented within the media carousel; and
   generating a message that includes the media item and the input in response to the selection of the media item from the media carousel.

3. The method of claim 1, wherein the graphical content of the one or more media items comprise augmented-reality filters.

4. The method of claim 1, wherein the collection of message content comprises a first media item and a second media item, and wherein the presenting the media carousel includes:
    causing display of a first graphical icon that represents the first media item and a second graphical icon that represents the second media item within the media carousel.

5. The method of claim 1, wherein the method further comprises:
    receiving a request to generate a message from the client device, the request to generate the message including the keyword and a media item from the media carousel; and
    associating the keyword with the media item within a media index in response to the receiving the request to generate the message.

6. The method of claim 1, wherein the determining the sort order of the one or more media items based on the ranking of the media items further comprises:
    determining a usage metric associated with each of the one or more media items; and
    determining the sort order based on the relevance and the usage metric.

7. A system comprising:
    a memory; and
    at least one hardware processor coupled to the memory and comprising instructions that causes the system to perform operations comprising:
    receiving an input into a messaging interface presented at a client device, the input comprising a text string;
    accessing a media repository that comprises a collection of media items tagged with index terms;
    curating a collection of message content that comprises one or more media items from among the collection of media items within the media repository based on the text string and the index terms, the one or more media items comprising graphical content;
    determining a sort order of the one or more media items from among the collection of message content based on a ranking of the media items, wherein the ranking is based on relevance to the text string received via the messaging interface; and
    presenting a display of the one or more media items within a suggestion carousel displayed at a position within the messaging interface of the client device based on the sort order, the suggestion carousel configured to receive a user input to scroll through the one or more media items within the suggestion carousel.

8. The system of claim 7, wherein the operations further comprise:
    receiving a selection of a media item from among the one or more media items presented within the media carousel; and
    generating a message that includes the media item and the input in response to the selection of the media item from the media carousel.

9. The system of claim 7, wherein the graphical content of the one or more media items comprise augmented-reality filters.

10. The system of claim 7, wherein the collection of message content comprises a first media item and a second media item, and wherein the presenting the media carousel includes:
    causing display of a first graphical icon that represents the first media item and a second graphical icon that represents the second media item within the media carousel.

11. The system of claim 7, wherein the operations further comprise:
    receiving a request to generate a message from the client device, the request to generate the message including the keyword and a media item from the media carousel; and
    associating the keyword with the media item within a media index in response to the receiving the request to generate the message.

12. The system of claim 7, wherein the determining the sort order of the one or more media items based on the ranking of the media items further comprises:
    determining a usage metric associated with each of the one or more media items; and
    determining the sort order based on the relevance and the usage metric.

13. A non-transitory machine-readable storage medium comprising instructions that, when executed by one or more processors of a machine, cause the machine to perform operations comprising:
    receiving an input into a messaging interface presented at a client device, the input comprising a text string;
    accessing a media repository that comprises a collection of media items tagged with index terms;
    curating a collection of message content that comprises one or more media items from among the collection of media items within the media repository based on the text string and the index terms, the one or more media items comprising graphical content;
    determining a sort order of the one or more media items from among the collection of message content based on a ranking of the media items, wherein the ranking is based on relevance to the text string received via the messaging interface; and
    presenting a display of the one or more media items within a suggestion carousel displayed at a position within the messaging interface of the client device based on the sort order, the suggestion carousel configured to receive a user input to scroll through the one or more media items within the suggestion carousel.

14. The non-transitory machine-readable storage medium of claim 13, wherein the operations further comprises:
    receiving a selection of a media item from among the one or more media items presented within the media carousel; and
    generating a message that includes the media item and the input in response to the selection of the media item from the media carousel.

15. The non-transitory machine-readable storage medium of claim 13, wherein the graphical content of the one or more media items comprise augmented-reality filters.

16. The non-transitory machine-readable storage medium of claim 13, wherein the collection of message content comprises a first media item and a second media item, and wherein the presenting the media carousel includes:
    causing display of a first graphical icon that represents the first media item and a second graphical icon that represents the second media item within the media carousel.

17. The non-transitory machine-readable storage medium of claim 13, wherein the operations further comprise:

receiving a request to generate a message from the client device, the request to generate the message including the keyword and a media item from the media carousel; and associating the keyword with the media item within a media index in response to the receiving the request to generate the message.

\* \* \* \* \*